Sept. 5, 1961   R. P. ALLEY   2,999,188
FAIL-SAFE OVERLOAD PROTECTIVE SYSTEM
Filed Sept. 4, 1958

Inventor:
Robert P. Alley,
by Irving H. Marshman
His Attorney.

United States Patent Office 2,999,188
Patented Sept. 5, 1961

2,999,188
FAIL-SAFE OVERLOAD PROTECTIVE SYSTEM
Robert P. Alley, Shirley, Ill., assignor to General Electric Company, a corporation of New York
Filed Sept. 4, 1958, Ser. No. 758,980
5 Claims. (Cl. 317—13)

This invention relates to control systems, more particularly to control systems for dynamoelectric machines such as electric generators and electric motors and it has for an object the provision of a simple, reliable and improved control system of this character. More specifically, the invention relates to overload protective control systems and a more specific object of the invention is the provision of a control system of this character in which temperature sensitive resistors having negative temperature coefficients are utilized for sensing overload conditions and are connected in a manner to provide fail-safe operation of the protective system.

In carrying the invention into effect in one form thereof, a pair of temperature sensitive resistance devices having negative temperature coefficients of resistance and adapted to be mounted in predetermined locations on a dynamoelectric machine are connected in parallel relationship with each other to receive voltages supplied from a pair of supply terminals. Response to an overload condition to initiate a protective operation is provided by means of an electroresponsive device having a first operating winding connected to receive a voltage derived from a portion of one of the temperature sensitive resistances and a second operating winding connected to receive a voltage derived from a portion of the other temperature sensitive resistance. These operating windings provide sufficient ampere turns in combination to prevent the initiation of a protective operation by the electroresponsive device when the temperature sensitive resistance devices are in their low-temperature high-resistance states, but when the temperature sensitive resistance devices acquire a lower resistance due to higher temperatures in the dynamoelectric machine, the current in the two operating windings becomes sufficiently low to permit the protective operation to occur. Under normal non-overload temperatures of the temperature sensitive resistance the ampere turns of both windings are required, as an important fail-safe feature, to prevent the electroresponsive device from initiating a protective operation.

Figure 1:
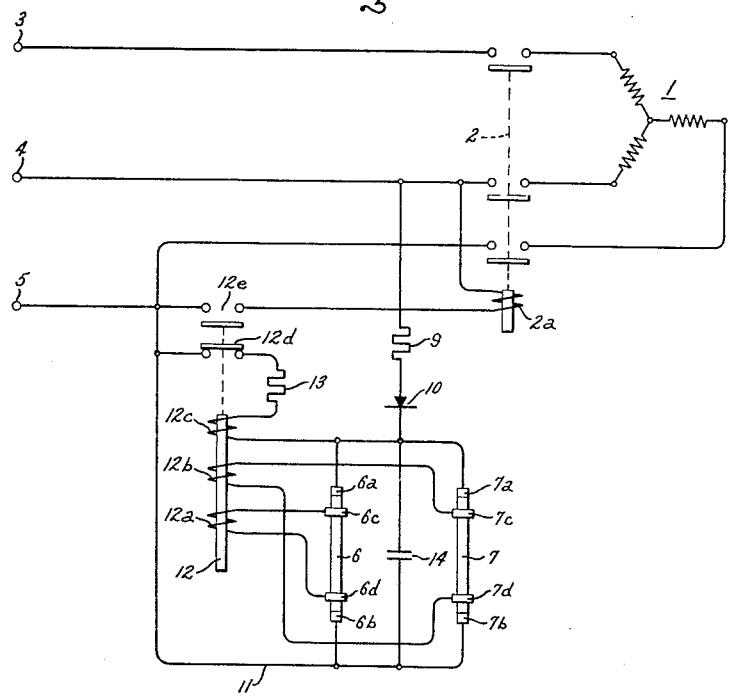
Figure 2:
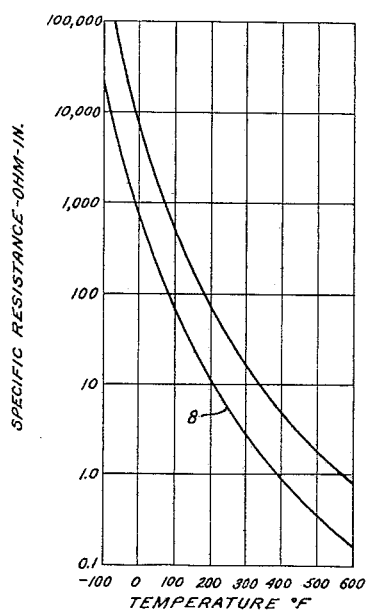
Figure 3:
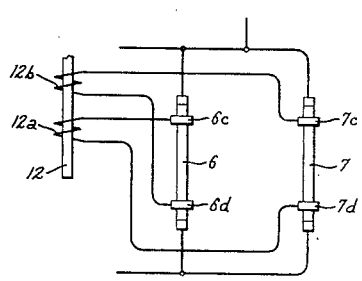

For a better and more complete understanding of the invention, reference should now be had to the following specification and to the accompanying drawings of which FIG. 1 is a simple, diagrammatical illustration of an embodiment of the invention, FIG. 2 is a chart of characteristic curves illustrating the relationship between specific resistance and temperature of a thermally sensitive resistor of the type employed in the invention, and FIG. 3 is a simple diagrammatic sketch of a detail of a modification of the embodiment illustrated in FIG. 1.

Referring now to the drawings, a dynamoelectric machine such, for example, as an induction motor 1, is connected by means of a line contactor 2 to be supplied from a suitable source such, for example, as represented by the three alternating supply terminals 3, 4 and 5.

Mounted on the motor, preferably embedded in the end turns of the stator winding are a pair of thermally sensitive resistance devices 6 and 7 connected in parallel relationship. One of the resistance devices 6 may be embedded in the end turns of one phase of the stator winding and the other device 7 may be embedded in the end turns of a different phase of the stator winding. These thermally sensitive resistance devices are of the type generally known in the trade as thermistors. They are electronic semi-conductors which are extremely sensitive to slight temperature variations. Changes in temperature as small as $\frac{1}{1000}$ of a degree centigrade can be measured with the aid of a thermistor. While conductors composed of typical metals have small positive temperature coefficients of electrical resistivity, thermistors have high negative temperature coefficients. When thermistors are cold their resistance is high; however as their temperatures rise, their resistances drop rapidly. A well-known thermistor material is composed of manganese, copper and cobalt oxides. The relationship between specific resistance in ohm-inches and temperature in degree Fahrenheit of such resistance material is represented by curve 8 of FIG. 2. In a typical case the thermistors 6 and 7 may have resistances of 10,000 ohms at 25° C. and approximately 800 ohms at 105° C.

Although the thermistors 6 and 7 may be of any suitable form, such, for example, as rod, disc or bead, they are illustrated as being of the rod type. The parallel combination of thermistors 6 and 7 is supplied from a suitable source of voltage such as a pair of supply terminals which may be the terminals 4 and 5 of one phase of the three phase terminals 3, 4 and 5. As shown the upper terminals 6a and 7a of the thermistors are connected to the supply terminal 4 through a voltage dropping resistor 9 and a half wave rectifier 10. Typically, the resistor 9 may appropriately have a value of 2000 ohms for a 220 v. supply. The lower terminals 6b and 7b of the thermistors are connected by means of a conductor 11 to the supply terminal 5.

In addition to the usual end terminal connections, the thermistors 6 and 7 are each provided with two connecting rings which are mechanically separated from the end terminals. As shown, thermistor 6 is provided with two such rings 6c and 6d located at the 5% and 95% resistance points so that approximately 90% of the thermistor resistance is located between the rings. The thermistor 7 is provided with similar connecting rings 7c and 7d similarly located.

To the connecting rings 6c and 6d are connected the terminals of one coil 12a of a relay 12 and to the connecting rings 7c and 7d of the other thermistor are connected the terminals of a second coil 12b of the relay. Each of the coils 12a and 12b supplies one-half the total number of ampere turns required to pick up the relay at a predetermined temperature of the thermistors. Typically, each of the coils 12a and 12b may have 3000 turns and the total ampere turns required to pick up the relay may appropriately be 300. The ampere turns at which the relay drops out may be of the order of 150. Each of the coils furnishes one-half of the pick-up and drop out ampere turns. A typical temperature at which the thermistors furnish the required current for the 300 ampere tuns pick up would be 50° C. and a typical drop out motor temperature which would reduce the ampere turns to the drop out value of 150 ampere turns would be 105° C. Thus, the normal motor temperature differential between pick up and drop out would be 55° C. A temperature differential of this magnitude would require an unnecessarily long time to elapse between drop out in response to overload and reset following the disappearance of the overload. In order to reduce the normal differential to a lower and more acceptable value, the relay 12 is provided with a third coil 12c connected in flux aiding relationship with coils 12a and 12b, and which, typically, may have 1000 turns and 80 ampere turns. Preferably, the ampere turns of this third coil are fewer than the ampere turns of either coil 12a or 12b when the thermistors are cool, i.e. below 90° C. This prevents reset with one very cold thermistor and one hot thermistor.

The relay 12 is provided with normally closed contacts 12d and with normally open contacts 12e. Coil 12c is connected between the positive terminal of the rectifier 10 and terminal 5 of the supply. Included in series relationship with it is a resistor 13. Typically, resistor 13 may have a resistance of 300–500 ohms and is adjusted to obtain a satisfactory relay reset characteristic. The operating coil 2a of line contactor 2 is connected in series with normally open contacts 12e across the supply terminals 4 and 5.

Connected in parallel circuit relationship with the thermistors 6 and 7 is a capacitor 14. This rectifier-capacitor combination supplies filtered direct voltage to the thermistors and the coils of the relay while the resistor 9 serves as a current limiter.

In operation, when the thermistors are cold, e.g. 50° C. or cooler, their resistances are relatively high and the voltage drops between their conducting rings is sufficiently high to produce the total number of ampere turns in coils 12a, 12b required to pick up relay 12. In its picked up condition, relay 12 opens its normally closed contacts 12d and closes its normally open contacts 12e. In closing, contacts 12e complete an energizing circuit for the operating coil 2a of the line contactor 2 which responds by closing its main contacts to connect the motor to the supply terminals 3, 4, and 5. As long as no overload condition arises, the relay 12 and the line contactor 2 remain picked up and the motor 1 is connected to the source.

If an overload condition of the motor arises, the thermistors 6 and 7 will heat. As their temperatures rise, their resistances decrease and consequently they serve as a path for increasingly greater amounts of the current which previously flowed through relay coils 12a and 12b, until at a predetermined value of overload and a predetermined value of motor temperature, e.g. 105° C., the combined ampere turns of the relay coils are insufficient to maintain the relay picked up. Consequently, it drops out and opens its normally open contacts 12e and closes its normally closed contacts 12d. Contacts 12e in opening, deenergize the line contactor 2 which opens to disconnect the motor from the supply source. Contacts 12d in closing energize the third coil 12c of the relay. This has the effect of reducing the temperature differential of the reset operation. Without the aid of this third coil, the thermistors would have to cool to the pick up temperature, e.g. 50° C., before the relay would pick up to reset the control. Thus, without coil 12c, the temperature differential of the reset operation would be 55° C. The third coil has the effect of reducing this differential to a much lower value, e.g. 15° C. Thus, typically, upon the thermistors' or motor's cooling to a predetermined temperature, e.g. approximately 90° C., the relay 12 would pick up and reset the control. It must be realized that the thermistors' temperature is not always the motor temperature due to their being heated by the current flowing through them.

The "fail-safe" feature of this control are as follows:

(1) If any lead supplying either thermistor or relay coil 12a or 12b is broken or disconnected the relay becomes deenergized and the line contactor 2 opened because neither coil of the relay has sufficient ampere turns at line voltage to maintain the relay picked up.

(2) If either lead of coil 12c is broken or disconnected, the reset i.e. pickup of the relay 12 is either delayed to a much lower thermistor temperature or possibly prevented entirely.

(3) If any lead to resistor 9 or to rectifier 10 is broken or disconnected or if the resistor or rectifier is broken, no current is supplied to the relay. Consequently, neither it nor the line contactor can be picked up.

(4) If the rectifier develops a short circuit, A.-C. is supplied to the coils of the relay. This would cause the relay to "buzz," but since the A.-C. impedance of the relay coils is considerably larger than the D.-C. resistance of these coils, insufficient current flows to pick up the relay and energize contactor 2.

(5) If resistor 9 is short circuited the thermistors and relay coils would be subjected to a current pulse of high magnitude which probably would destroy the thermistors thereby to interrupt the voltage supply to the relay coils.

(6) If the capacitor 14 develops a short circuit, the voltage drop across the thermistors is reduced below the drop out value of the relay 12 and the latter opens to deenergize and open the line contactor.

Thus the circuit is fail-safe, i.e. the relay drops out in response to a variety of failures of components or leads and opens the contactor 2 to remove the motor from the line.

Instead of each of the relay coils 12a and 12b being connected to the connection rings of one thermistor they may be cross connected in the manner shown in FIG. 3.

Although in accordance with the provisions of the patent statutes this invention is described as embodied in specific apparatus and the principle of the invention has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of the invention or from the scope of the annexed claims.

What we claim as new and desire to secure by Letters Patent of the United States is:

1. An overload protective system comprising in combination: a pair of voltage supply terminals; a pair of thermally sensitive resistors having negative temperature coefficients of resistance adapted to be mounted in thermal contact with an electrical load device and connected electrically in parallel relationship to receive voltages supplied from said terminals; and an electroresponsive device for controlling the energization of said load device said electroresponsive device having first and second operating windings each connected to points on a corresponding one of said thermally sensitive resistors that are mechanically separated from the terminal connections of said temperature sensitive devices to said supply terminals, said electroresponsive device responding to currents in said first and second operating windings to energize said load when the temperatures of said thermally sensitive resistors fall below predetermined values and to deenergize said load when the temperatures of said thermally sensitive resistors exceed predetermined higher values, each of said windings supplying less than the total number of ampere turns required to maintain the energization of said load.

2. An overload motor protective system comprising in combination: an energization circuit including a pair of voltage supply terminals and a pair of thermally sensitive resistors having negative temperature coefficients of resistance adapted to be mounted on a dynamoelectric machine in predetermined locations and connected electrically in parallel relationship to receive voltages supplied from said terminals, the potentials across said thermally sensitive resistors varying according to the temperature thereof; a relay having normally open contacts, normally closed contacts, and a pair of operating windings arranged in flux aiding relationship each connected to receive operating potentials dropped across respectively different portions of said thermally sensitive resistors, and having an armature for actuating said contacts picked up in response to potentials applied to both of said operating windings as a result of a predetermined temperature of said thermally sensitive resistors and dropped out in response to a reduction of potentials applied to both operating windings as a result of a predetermined higher value of temperature, each one of said operating windings having less than the total number of ampere turns required to maintain said armature in picked-up condition thereby to cause said armature to drop out in the event of current interruption in either operating winding; and a third winding on said relay energized in the closed condition of said normally closed contacts for reducing the temperature differential between drop-out and pick-up temperature values.

3. An overload protective system for an electrical load device comprising: an electroresponsive switching device having normally open contacts for controlling the energization of said load device and having a pair of operating windings; an energization circuit including a pair of thermally sensitive elements the potential drop across which varies inversely according to their temperatures connected electrically in parallel and adapted to be mounted in thermal contact with said load device; means connecting each of said operating windings to respective points on said elements mechanically separate from the terminal connections of said elements to said energization circuit to receive potentials developed across respectively different portions of said elements, said switching device responding to the potentials developed across both of said windings to close its contacts when the temperatures of said elements are less than predetermined values and to open its contacts when the temperatures of said elements exceed predetermined values, and each one of said windings supplying less than the total ampere turns required to maintain said contacts closed.

4. An overload protective system for an electrical load device comprising: a pair of electrical supply terminals for energization by a potential of predetermined magnitude; a pair of thermistors having negative temperature coefficients of resistance connected electrically in parallel to receive potentials supplied from said terminals and adapted to be mounted in thermal contact with said load device; and an electroresponsive switching device having normally open contacts for controlling the energization of said load device and having a pair of operating windings, said operating windings being connected to be supplied with operating potentials developed across respectively different portions of said thermistors to respond to less than the total potentials dropped across said thermistors, said windings supplying sufficient ampere turns in combination to close the contacts of said switching device when the temperatures of said thermistors are below predetermined values and supplying insufficient ampere turns to maintain said contacts closed when the temperatures of said thermistors are above predetermined values, and each one of said windings supplying less than the total number of ampere turns required to maintain said contacts closed.

5. An overload protective system for an electrical load device comprising: a pair of electrical supply terminals for energization by a potential of predetermined magnitude; a pair of thermistors having negative temperature coefficients of resistance connected electrically in parallel and adapted to be mounted in thermal contact with said load device; an energization circuit including a dropping resistor connected in series with the parallel combination of said thermistors across said terminals, whereby the potentials across said thermistors vary in accordance with the temperatures of said load device; and an electroresponsive switching device having normally open contacts for controlling the energization of said load device and having a pair of operating windings; said operating windings being connected to be supplied with operating potentials developed across respectively different portions of said thermistors mechanically separate from the terminal connections of said thermistors in said energization circuit to respond to less than the total potentials dropped across said thermistors, said windings supplying sufficient ampere turns in combination to close the contacts of said switching device when the temperatures of said thermistors are below predetermined values and supplying insufficient ampere turns to maintain said contacts closed when the temperatures of said thermistors are above predetermined values, and each one of said operating windings supplying less than the total ampere turns required to maintain said contacts closed.

References Cited in the file of this patent

UNITED STATES PATENTS

| 2,353,268 | Roberts | July 11, 1944 |
| 2,358,215 | Darling | Sept. 12, 1944 |
| 2,607,831 | Jones | Aug. 19, 1952 |
| 2,885,604 | Stavrinaki | May 5, 1959 |

FOREIGN PATENTS

| 121,164 | Australia | Apr. 23, 1943 |
| 557,707 | Great Britain | Dec. 1, 1943 |
| 735,755 | Great Britain | Aug. 31, 1955 |